US011258966B2

(12) United States Patent
Itano

(10) Patent No.: US 11,258,966 B2
(45) Date of Patent: Feb. 22, 2022

(54) PHOTOELECTRIC CONVERSION DEVICE, CAMERA, MOVABLE OBJECT, AND SIGNAL PROCESSING DEVICE

(71) Applicant: CANON KABUSHIKI KAISHA, Tokyo (JP)

(72) Inventor: Tetsuya Itano, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/653,671

(22) Filed: Oct. 15, 2019

(65) Prior Publication Data

US 2020/0128198 A1 Apr. 23, 2020

(30) Foreign Application Priority Data

Oct. 22, 2018 (JP) .............................. JP2018-198703

(51) Int. Cl.
*H04N 5/343* (2011.01)
*H04N 5/347* (2011.01)
*H04N 5/378* (2011.01)

(52) U.S. Cl.
CPC ............. *H04N 5/343* (2013.01); *H04N 5/347* (2013.01); *H04N 5/378* (2013.01)

(58) Field of Classification Search
CPC .... H04N 5/235; H04N 5/2355; H04N 5/2327; H04N 5/23293; H04N 5/23251; H04N 5/351; H04N 5/23245; H04N 5/23254; H04N 5/232939; H04N 5/347; H04N 5/353; H04N 5/35572; H04N 5/374; H04N 9/045; H04N 9/04557; H04N 2101/00; H04N 2209/045; H04N 5/144; H04N 5/2352; H04N 5/341; H04N 5/3535; H04N 5/35554; H04N 5/35563; H04N 5/357; H04N 5/369; H04N 5/37457; H04N 5/378; H04N 9/07; H04N 5/23248; H04N 5/23267; H04N 5/23274; H04N 5/32; H04N 5/335;
(Continued)

(56) References Cited

U.S. PATENT DOCUMENTS 9,325,922 B2 4/2016 Ohya
2015/0319341 A1* 11/2015 Sekine ................... H04N 9/045
348/64

OTHER PUBLICATIONS

O. Kumagai, et al. ("A ¼-inch 3.9Mpixel Low-Power Event-Driven Back-Illuminated Stacked CMOS Image Sensor", ISSCC Dig. Tech. Papers, pp. 86-88, Feb. 2018).

* cited by examiner

*Primary Examiner* — Samira Monshi
(74) *Attorney, Agent, or Firm* — Canon U.S.A., Inc. IP Division

(57) ABSTRACT

A photoelectric conversion device of an embodiment includes a plurality of pixels, a signal processing circuit, and a switch unit. The signal processing circuit performs analog-to-digital conversion on signals output from the plurality of pixels. The switch unit performs switching between a first mode for motion detection to input a first signal generated by adding signals of at least two pixels to the signal processing circuit and a second mode to input respective signals of the at least two pixels to the signal processing circuit individually as second signals. A first period from start to end of a readout operation performed by the signal processing circuit in order to process the first signal is shorter than a second period from start to end of a readout operation performed by the signal processing circuit in order to process one of the second signals.

29 Claims, 12 Drawing Sheets

(58) Field of Classification Search
CPC .... H04N 5/361; H04N 5/365; H04N 9/04511; H04N 9/04515
See application file for complete search history.

PHOTOELECTRIC CONVERSION DEVICE, CAMERA, MOVABLE OBJECT, AND SIGNAL PROCESSING DEVICE

BACKGROUND

Field

One disclosed aspect of the embodiments relates to a photoelectric conversion device, a camera, a movable object, and a signal processing device.

Description of the Related Art

An imaging device having a function of detecting motion of an object has been proposed. An imaging device disclosed in O. Kumagai, et al. ("A ¼-inch 3.9 Mpixel Low-Power Event-Driven Back-Illuminated Stacked CMOS Image Sensor", IS SCC Dig. Tech. Papers, pp. 86-88, February 2018) is intended to reduce power consumption in a motion detection period by dividing a pixel array into a plurality of pixel blocks and adding (or binning) and reading out a signal within the pixel block. Once motion of an object is detected, the imaging device outputs an image having a higher resolution. That is, O. Kumagai, et al. discloses an event-driven type image sensor.

According to the technique disclosed by O. Kumagai, et al., binning is performed by using a switch that connects a plurality of output lines and a switch that connects floating diffusion (FD) nodes (hereafter, referred to as an FD node) of pixels. In motion detection, however, it may be difficult to sufficiently reduce power consumption by using the binning operation.

SUMMARY

An aspect of the embodiments reduces power consumption in a photoelectric conversion device, in particular, an event-driven type image sensor.

A photoelectric conversion device of an embodiment includes a plurality of pixels, a signal processing circuit, and a switch unit. The signal processing circuit performs analog-to-digital conversion on signals output from the plurality of pixels. The switch unit performs switching between a first mode for motion detection to input a first signal generated by adding signals of at least two pixels to the signal processing circuit and a second mode to input respective signals of the at least two pixels to the signal processing circuit individually as second signals. The first period from start to end of a readout operation performed by the signal processing circuit in order to process the first signal is shorter than a second period from start to end of a readout operation performed by the signal processing circuit in order to process one of the second signals.

A photoelectric conversion device of another embodiment includes a plurality of pixels, a signal processing circuit, and a switch unit. The signal processing circuit performs analog-to-digital conversion on signals output from the plurality of pixels. The switch unit performs switching between a first mode to input a first signal generated by adding signals of at least two pixels to the signal processing circuit and a second mode to input respective signals of the at least two pixels to the signal processing circuit individually as second signals. In the first mode, a readout operation performed by the signal processing circuit in order to process the first signal includes a first number of times of the analog-to-digital conversion. In the second mode, a readout operation performed by the signal processing circuit in order to process one of the second signals includes a second number of times, which is greater than the first number of times, of the analog-to-digital conversion.

A signal processing device of an embodiment includes a signal processing circuit that performs analog-to-digital conversion on an input signal. The signal processing circuit has a first mode to input a first signal generated by adding at least two signals to the signal processing circuit and a second mode to input respective of the at least two signals to the signal processing circuit individually as second signals. A first period from start to end of a readout operation performed by the signal processing circuit in order to process the first signal in the first mode is shorter than a second period from start to end of a readout operation performed by the signal processing circuit in order to process one of the second signals in the second mode.

A signal processing device of another embodiment includes a signal processing circuit that performs analog-to-digital conversion on an input signal. The signal processing circuit has a first mode to input a first signal generated by adding at least two signals to the signal processing circuit and a second mode to input respective of the at least two signals to the signal processing circuit individually as second signals. In the first mode, a readout operation performed by the signal processing circuit in order to process the first signal includes a first number of times of the analog-to-digital conversion. In the second mode, a readout operation performed by the signal processing circuit in order to process one of the second signals includes a second number of times, which is greater than the first number of times, of the analog-to-digital conversion.

Further features of the disclosure will become apparent from the following description of exemplary embodiments with reference to the attached drawings.

DESCRIPTION OF THE EMBODIMENTS

Embodiments of the disclosure will be described in detail below by using the drawings. The disclosure is not limited to only the embodiments described below. A modified example in which one or more features of the embodiment described below are changed within the scope not departing from the spirit of the disclosure is also one of the embodiments of the disclosure. Further, an example in which one or more features of any of the following embodiments are added to another embodiment or are replaced with one or more features of another embodiment is also one of the embodiments of the disclosure.

First Embodiment

With reference to a circuit block diagram of FIG. 1, a photoelectric conversion device according to the first embodiment will be described. The photoelectric conversion device of the present embodiment is an image sensor IM1 that captures an object. Alternatively, the image sensor IM1 may also be referred to as an imaging device.

Figure 1:
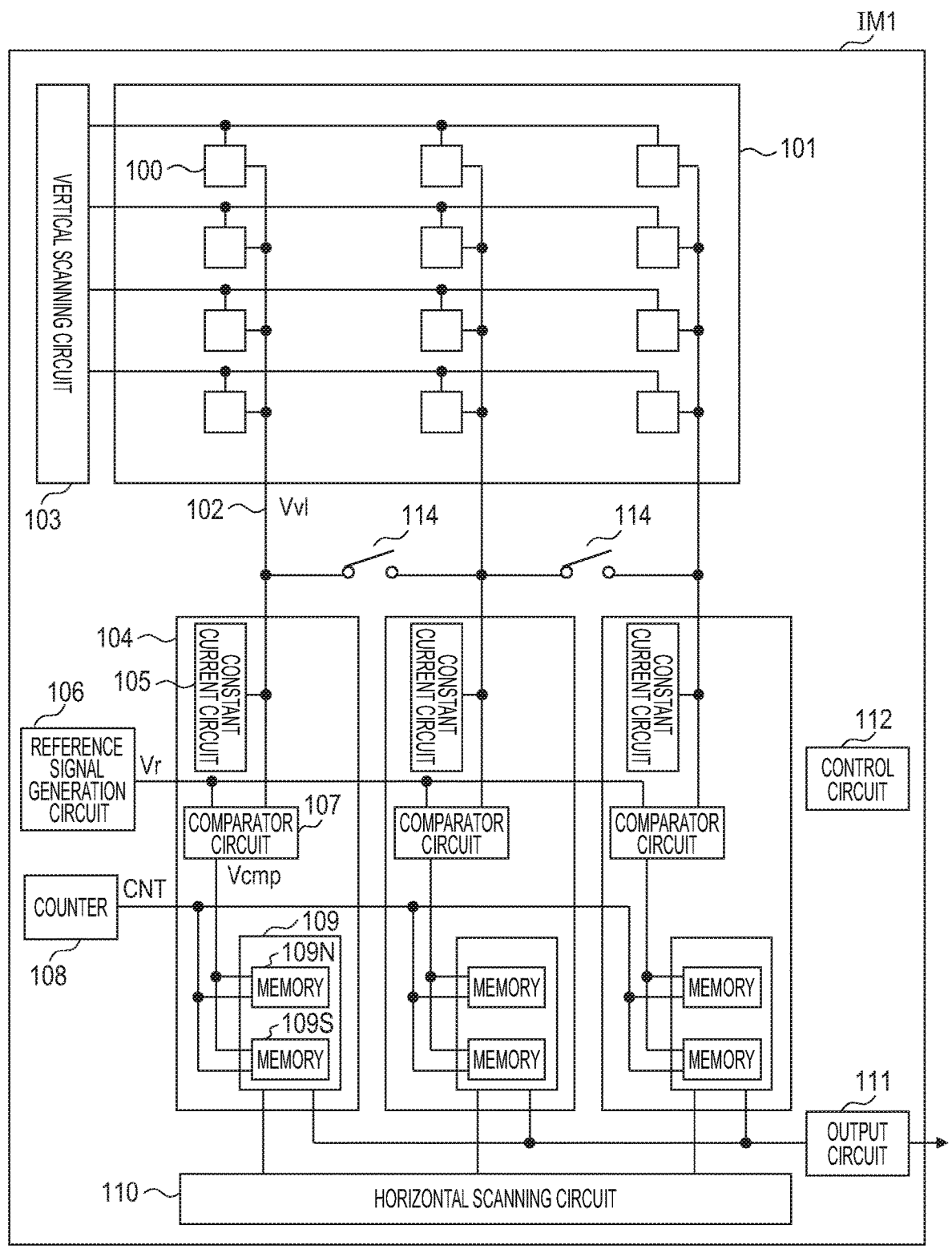
FIG. 1 is a schematic diagram of a photoelectric conversion device according to a first embodiment.

FIG. 1 schematically illustrates components of the image sensor IM1. A pixel array 101 is formed of a plurality of pixels 100 arranged in a matrix. The plurality of pixels 100 are arranged so as to form a plurality of columns. FIG. 1 illustrates a pixel array 101 including the pixels 100 arranged in four rows by three columns as one example. The arrangement and the number of multiple pixels 100 in the pixel array 101 are not limited to the above.

Each of the pixels 100 generates a pixel signal in accordance with an incident light. Once a light enters the pixel 100, charge is generated by photoelectric conversion. A pixel signal is a signal based on charge generated by photoelectric conversion. Both of a signal being processed inside the pixel 100 and a signal output from the pixel 100 are referred to as a pixel signal. Further, the pixel 100 may generate a signal independently of a signal (pixel signal) based on charge generated by photoelectric conversion. For example, the pixel 100 generates a reset level signal based on a reset state. A pixel signal and a reset level signal are distinguished from each other in accordance with the state of the pixel 100 when the signal of interest is generated.

Note that a pixel signal and a reset level signal are output from the pixel 100 and then routed to some circuit blocks. In each of such stages, the pixel signal and the reset level signal may be collectively referred by a different name.

The plurality of pixels 100 belonging to the same row are connected commonly to one or a plurality of drive lines. When a single pixel 100 includes a plurality of controlled elements, the corresponding number of drive lines is arranged for a single row. A vertical scanning circuit 103 supplies a control signal used for controlling the operation of the pixel 100 to the pixel 100 through a drive line.

A plurality of output lines are arranged in association with a plurality of columns. For example, a single output line is arranged on a single column. In such a case, the plurality of pixels 100 forming a single column are connected commonly to a single output line 102. Alternatively, a plurality of output lines are arranged on a single column. In such a case, some of the plurality of pixels 100 forming one column are connected to one of the plurality of output lines, while another of the plurality of pixels 100 forming the same column are connected to another one of the plurality of output lines.

A signal processing circuit of the present embodiment includes a plurality of column circuits 104. The output line 102 is connected to each column circuit 104. A signal supplied to the column circuit 104 through the output line 102 is referred to as a vertical line signal Vv1.

The column circuit 104 includes a constant current circuit 105, a comparator circuit 107, and a memory unit 109. The constant current circuit 105 forms a source follower circuit together with some of the pixels 100. The source follower circuit outputs, to the output line 102, a signal in accordance with the state of the pixel 100 (a pixel signal or a reset level signal) as the vertical line signal Vv1.

The output line 102 is connected to the comparator circuit 107, and the vertical line signal Vv1 is supplied to the comparator circuit 107. A reference signal Vr is supplied from a reference signal generation circuit 106 to the comparator circuit 107 in addition to the vertical line signal Vv1. The reference signal generation circuit 106 outputs a ramp signal as the reference signal Vr in response to an instruction from a control circuit 112. The ramp signal refers to a signal that varies with lapse of time at a constant rate.

The comparator circuit 107 compares the vertical line signal Vv1 and the reference signal Vr and supplies, to a memory unit 109, a comparison signal Vcmp in accordance with the comparison result. As one example, the comparator circuit 107 of the present embodiment sets the comparison signal Vcmp to a L-level when the vertical line signal Vv1 is less than the reference signal Vr and sets the comparison signal Vcmp to a H-level when the vertical line signal Vv1 is greater than the reference signal Yr.

A count signal CNT is supplied from a counter 108 to the memory unit 109. The counter 108 counts up a count value indicated by the count signal CNT with lapse of time in response to an instruction from the control circuit 112. The memory unit 109 holds a difference between a count value at the time when the reference signal generation circuit 106 starts supplying a ramp signal and a count value at the time when the level of the comparison signal Vcmp is switched.

That is, analog-to-digital conversion to convert the vertical line signal Vv1 into a digital value is performed by using the reference signal generation circuit 106, the comparator circuit 107, the counter 108, and the memory unit 109. Each column circuit 104 includes the comparator circuit 107 as an analog-to-digital converter. Furthermore, each column circuit 104 may include the counter 108.

In the present embodiment, the memory unit 109 includes a memory 109S and a memory 109N. Each of the memory 109S and the memory 109N holds a difference between a count value at the time when the reference signal generation circuit 106 starts supplying a ramp signal and a count value at the time when the level of the comparison signal Vcmp is switched.

The memory 109N holds a digital value corresponding to the vertical line signal Vv1 resulted after the pixel 100 is reset (reset level signal). Further, the memory 109S holds a digital value corresponding to the vertical line signal Vv1 in a state where a pixel signal is being read out in the pixel 100.

The horizontal scanning circuit 110 sequentially reads out a digital value from a plurality of memory units 109 to the output circuit 111. The output circuit 111 generates a digital signal D corresponding to a pixel signal based on a digital value read out from the memory unit 109 and outputs the digital signal D to the outside of the image sensor IM1. The control circuit 112 controls the operation of respective components by supplying a control signal to respective components of the image sensor IM1.

Figure 2:
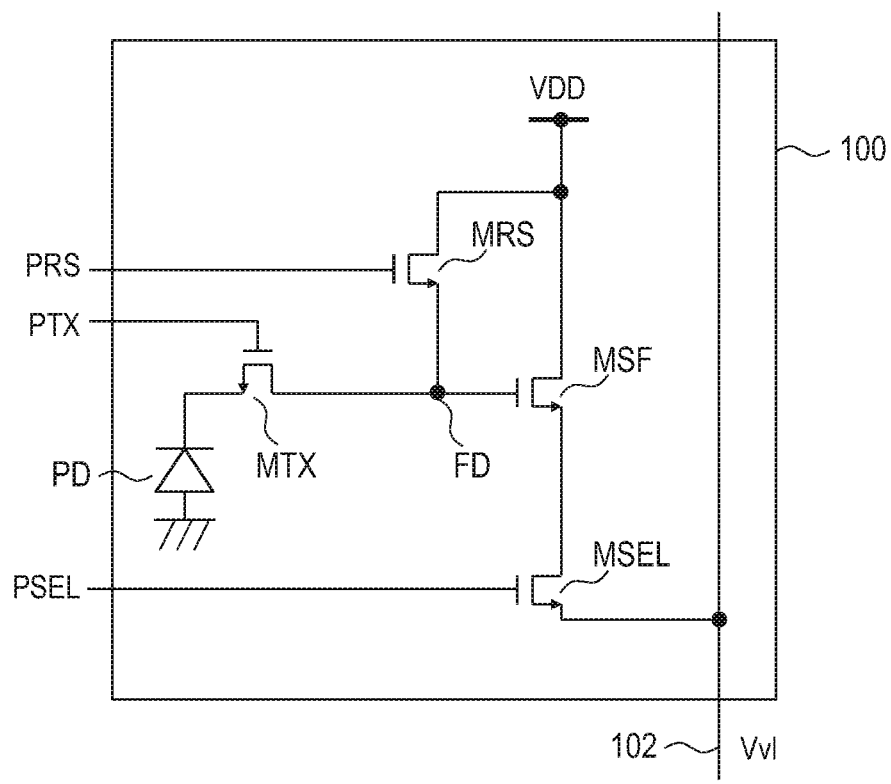
FIG. 2 is an equivalent circuit diagram of a pixel according to the first embodiment.

With reference to FIG. 2, the configuration of the pixel 100 of the image sensor IM1 will be described. FIG. 2 is an equivalent circuit diagram of the pixel 100.

The pixel 100 includes a photodiode PD, an amplification transistor MSF, a transfer transistor MTX, a reset transistor MRS, and a select transistor MSEL. The photodiode PD generates charge in accordance with an incident light to the pixel 100 and accumulates the charge. The transfer transistor MTX, the reset transistor MRS, and the select transistor MSEL are controlled to enter a conductive state or a non-conductive state by control signals PTX, PRS, and PSEL supplied from the vertical scanning circuit 103, respectively. The gate of the amplification transistor MSF is connected to a floating diffusion node (hereafter, referred to as an FD node). The source of the amplification transistor MSF is connected to the output line 102 via the select transistor MSEL.

Once the control signal PRS is controlled to the H level, the reset transistor MRS enters the conductive state, and the FD node is connected to a power source voltage VDD. At this time, a state where the voltage of the FD node is being reset is resulted. Then, in response to the reset transistor MRS transitioning to the non-conductive state, a state where the voltage of the FD node has been reset is resulted. At this time, such a state is referred to as a state where the pixel 100 has been reset. In response to the control signal PTX being controlled to the H level, the transfer transistor MTX transitions to the conductive state, and the charge accumulated in the photodiode PD, that is, a pixel signal is transferred to the FD node. In response to the control signal PSEL being controlled to the H level, the select transistor MSEL transitions to the conductive state, a current is supplied from the constant current circuit 105 of FIG. 1 to the amplification transistor MSF via the output line 102. That is, the amplification transistor MSF and the constant current circuit 105 form a source follower circuit and output a signal corresponding to the state of a pixel as the vertical line signal Vv1. For example, in a state where the voltage of the FD node has been reset, a reset level signal is output from the pixel 100. Further, in a state where charge generated in the FD node by photoelectric conversion have been transferred, the pixel 100 outputs a signal based on charge generated by photoelectric conversion, that is, a pixel signal.

In the present embodiment, the FD node is an input node that receives a signal based on charge generated by photoelectric conversion. The reset transistor MRS is a reset unit that resets the input node.

Figure 3:
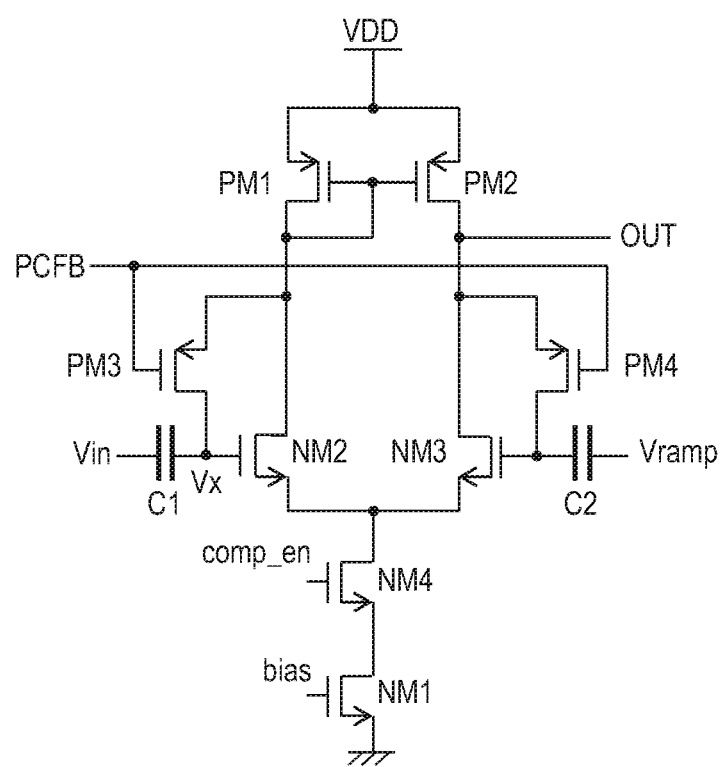
FIG. 3 is an equivalent circuit diagram of a comparator circuit according to the first embodiment.

With reference to FIG. 3, the configuration of the comparator circuit 107 will be described. FIG. 3 is an equivalent circuit diagram of the comparator circuit 107.

The comparator circuit 107 of the present embodiment is formed by using a differential amplifier. The comparator circuit 107 includes n-channel MOS transistors NM1 to NM4. The transistor NM1 is a current source. A bias voltage "bias" is supplied to the gate of the transistor NM1. The source of the transistor NM1 is connected to a ground node. The transistor NM2 and the transistor NM3 are input transistors of the differential amplifier.

The source of the transistor NM4 is connected to the drain of the transistor NM1. Further, the drain of the transistor NM4 is connected to the source of the transistor NM2 and the source of the transistor NM3. A control signal comp_en is supplied to the gate of the transistor NM4. When the control signal comp_en is at the high level, the transistor NM4 is conducted, and the comparator circuit 107 is activated. On the other hand, when the control signal comp_en is at the low level, the transistor NM4 is not conducted, and the comparator circuit 107 is inactivated.

The comparator circuit 107 includes p-channel MOS transistors PM1 to PM4. The transistor PM1 and the transistor PM2 form a current mirror circuit. Each of the transistor PM3 and the transistor PM4 is a switch element that short-circuits a path between the gate and the drain of the corresponding input transistor. A control signal PCFB controls the transistor PM3 and PM4.

A node Vin is connected to the output line 102. The vertical line signal Vv1 of the output line 102 is input to a node Vx via a capacitor C1. The capacitor C1 is referred to as a signal input capacitor. The reference signal Vr from the reference signal generation circuit 106 is provided to the node Vramp. The reference signal Vr is input to the gate of the transistor NM3 via a capacitor C2.

Figure 4:
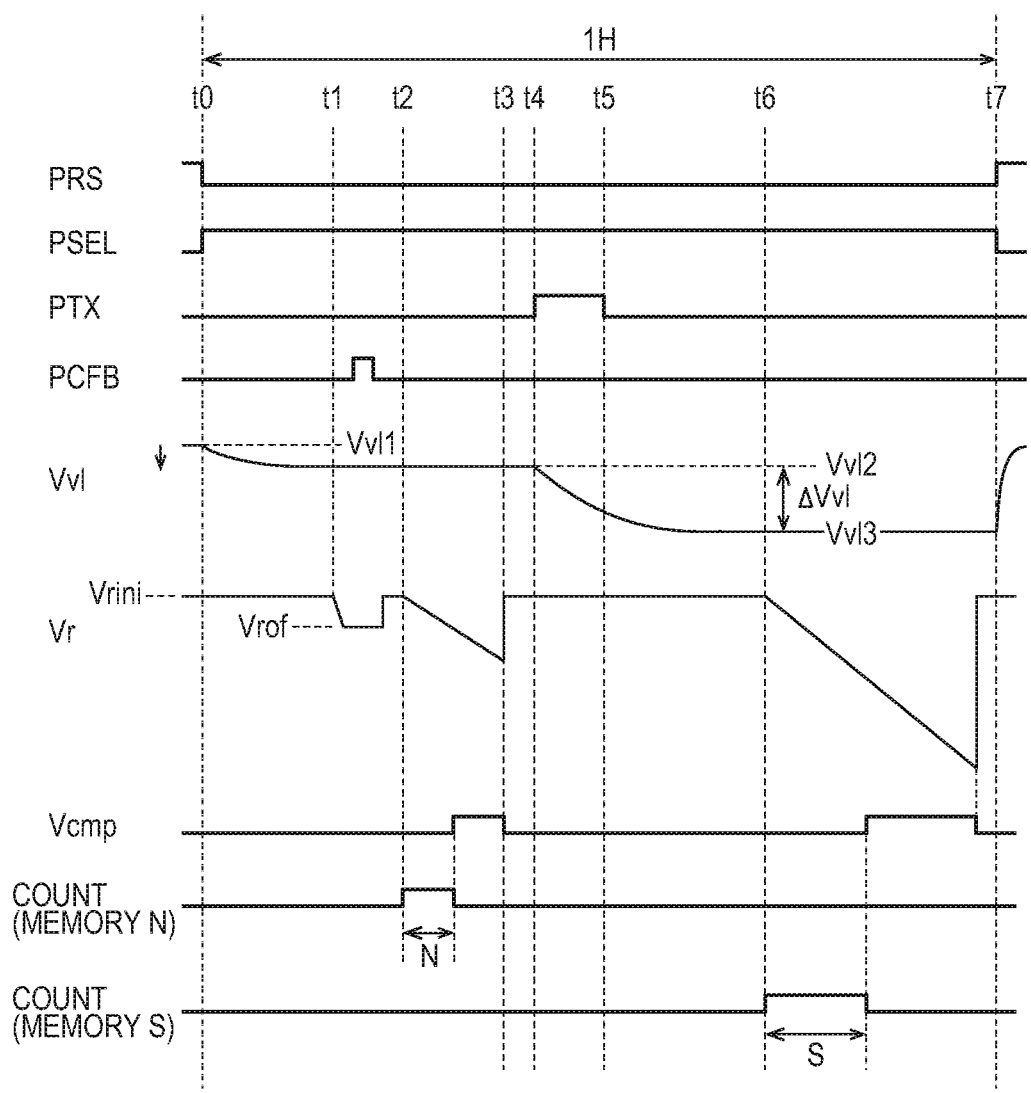
FIG. 4 is a timing chart diagram schematically illustrating driving of the photoelectric conversion device according to the first embodiment.
Figure 5:
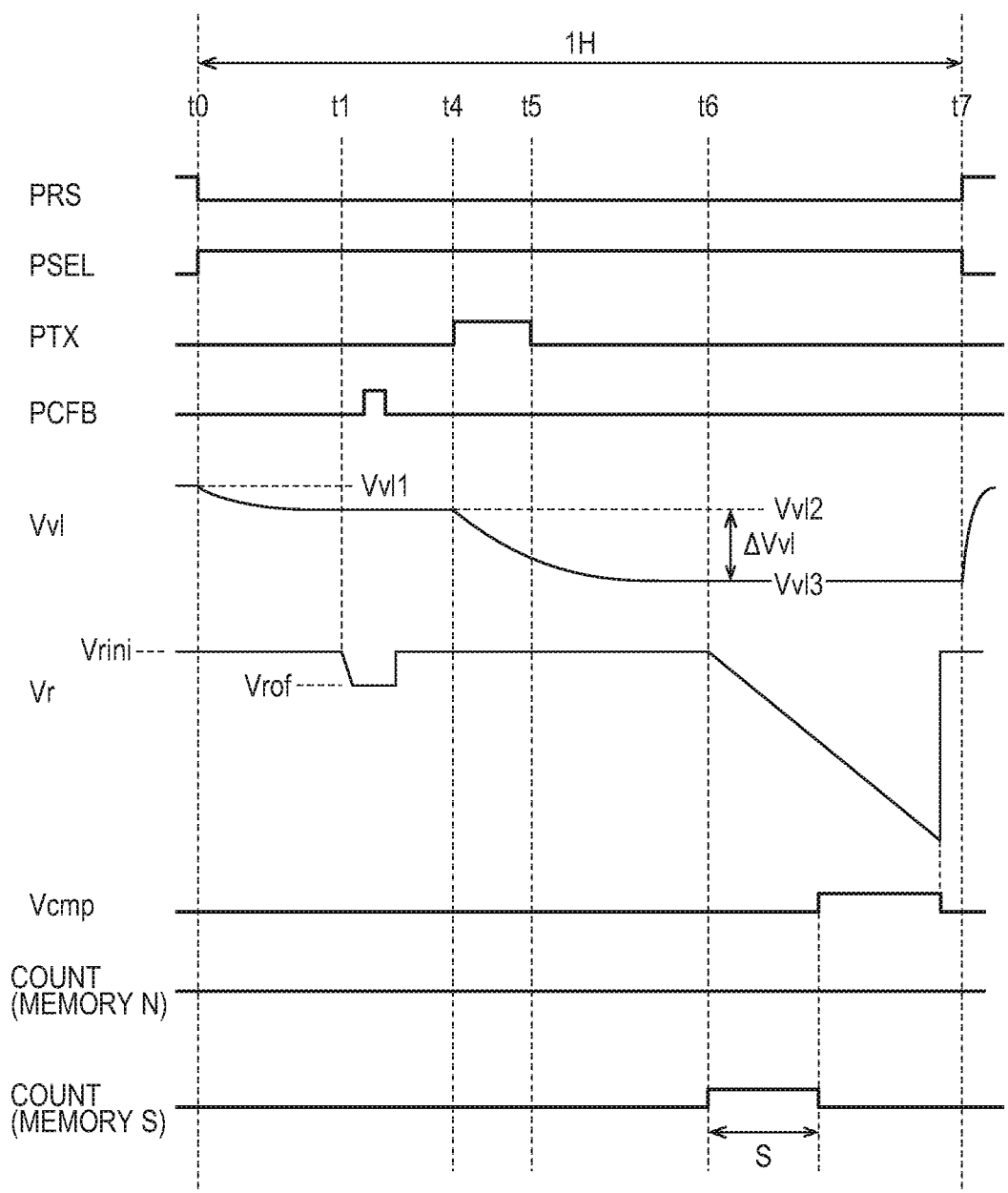
FIG. 5 is a timing chart diagram schematically illustrating driving of the photoelectric conversion device according to the first embodiment.
Figure 6:
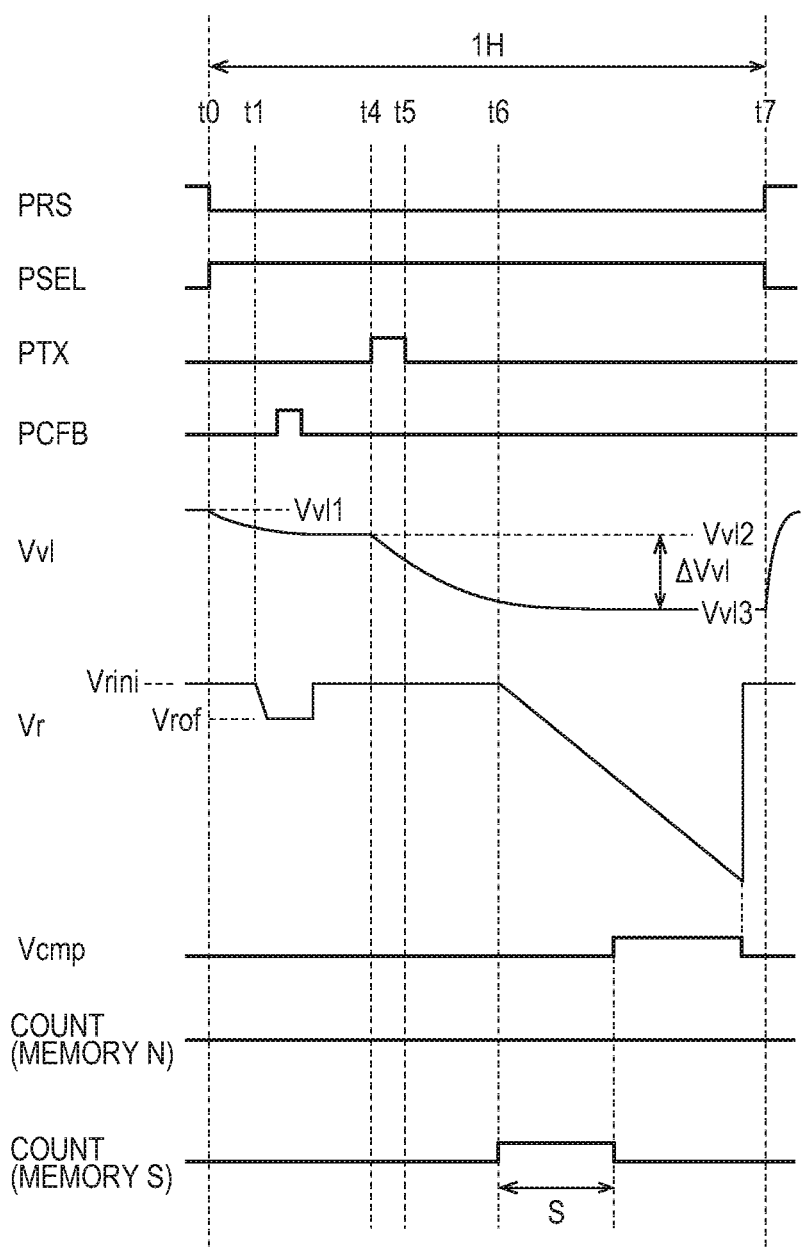
FIG. 6 is a timing chart diagram schematically illustrating driving of the photoelectric conversion device according to the first embodiment.

Next, the operation of the image sensor IM1 of the present embodiment will be described. The image sensor IM1 is operated by the control circuit 112 controlling the operation of respective components of the image sensor IM1. FIG. 4 to FIG. 6 schematically illustrate timing charts of control signals used for controlling respective components. Further, FIG. 4 to FIG. 6 schematically illustrate signal values of signals output by the image sensor IM1, respectively.

The pixel 100 is operated by the control circuit 112 controlling the vertical scanning circuit 103. The readout of a digital value from the memory unit 109 to the output circuit 111 is performed by the control circuit 112 controlling the horizontal scanning circuit 110.

The image sensor IM1 of the present embodiment has an imaging mode to perform normal capturing and a motion detection mode to detect motion of an object. In the imaging mode, each of pixel signals of at least two pixels 100 are input individually to the column circuits 104, respectively. In the motion detection mode, a signal generated by adding the same pixel signals of the at least two pixels 100 is input to the column circuits 104.

Here, addition of a plurality of signals is signal processing including at least addition of a plurality of signals, averaging of a plurality of signals, and binning of a plurality of signals. Further, the image sensor IM1 includes a switch unit that switches two modes one another. The addition operation and the switch unit will be described below in detail. Further, the purpose of each mode is not limited to capturing or motion detection. The image sensor IM1 may be any image sensor having a mode to add at least two signals and a mode to individually read out the at least two signals.

First, with reference to FIG. 4, a pixel signal readout operation in the imaging mode will be described. The pixel signal readout operation refers to an operation to output a pixel signal from a single pixel 100 and hold a digital value corresponding to the pixel signal in the memory unit 109. Typically, one time of the pixel signal readout operation is performed on each of the pixels 100 to be read out in one frame. One time of the pixel signal readout operation will be described below. Basically, the operation illustrated in FIG. 4 is performed simultaneously for the plurality of pixels 100 forming the same row.

The period from the time t0 to the time t7 of FIG. 4 is referred to as a one-H period corresponding to readout of one row. The image sensor IM1 reads out a pixel signal used for one frame from the pixel array 101 by performing the operation illustrated in a one-H period of FIG. 4 on each of the plurality of pixel rows forming the pixel array 101.

Throughout the one-H period illustrated in FIG. 4, the vertical scanning circuit 103 maintains, at the H level, the control signal PSEL supplied to a target pixel 100 for a pixel signal readout operation and, on the other hand, maintains the control signal PSEL supplied to other pixels 100 at the L level. Thereby, a target pixel 100 for a pixel signal readout operation is selected.

Once a pixel signal readout operation is started at the time t0, the vertical scanning circuit 103 controls the control signal PRS of the target pixel 100 for the pixel signal readout operation from the H level to the L level. Thereby, the pixel 100 transitions from a state where reset is being performed to a state where reset is completed (a reset state). That is, the timing when the control signal PRS is switched from the H level to the L level is a timing of releasing reset of the pixel 100. In FIG. 4, a vertical line signal Vvl1 has a signal value of the output line 102 corresponding to the pixel 100 in a state where reset is being performed. In FIG. 4, a vertical line signal Vvl2 has a value of the output line 102 corresponding to the pixel 100 in a reset state (vertical line signal at pixel reset). That is, the vertical line signal Vvl2 represents a reset level signal. Upon the completion of reset of the pixel 100, the signal value of the output line 102 changes from the vertical line signal Vvl1 to the vertical line signal Vvl2.

After the output line 102 is settled to the vertical line signal Vvl2, at the time t1, the output of the reference signal generation circuit 106 changes in response to an instruction from the control circuit 112 and is set to an offset voltage Vrof. The control signal PCFB is then controlled to the H level, and the input terminal and the output terminal of the comparator circuit 107 have substantially the same voltage.

In response to an instruction from the control circuit 112, the reference signal generation circuit 106 starts supplying a ramp signal as the reference signal Vr at the time t2 after reset to the change start voltage Vrini. In other words, the reference signal generation circuit 106 starts changing the value of the reference signal Vr at a constant rate with respect to lapse of time.

At the same time, the counter 108 starts counting up the output count value from zero in accordance with an instruction from the control circuit 112. Once the reference signal Vr decreases below the offset voltage Vrof and the comparison signal Vcmp is switched from the L level to the H level, the memory 109N holds the count value from the counter 108 at that time. This count value corresponds to a digital value obtained by performing AD conversion on a reset level signal. Hereafter, such AD conversion is referred to as N-conversion, and a digital value held by the N-conversion is referred to as N.

The H level of the count (memory N) in FIG. 4 represents a state where the count value in the memory 109N is changing, and the L level represents a state where the count value in the memory 109N is not changing.

A change is started in response to the count up of the counter 108 (H level) at the time t2, and the change is stopped for holding the count value at the time when the comparison signal Vcmp is switched from the L level to the H level (L level).

At the time t3 that is the end time of N-conversion, the reference signal generation circuit 106 is reset to the change start voltage Vrini in response to an instruction from the control circuit 112.

The vertical scanning circuit 103 then transfers charge accumulated in the photodiode PD, that is, a pixel signal to the FD node by controlling the control signal PTX to the H level temporarily in the period from the time t4 to the time t5. In response, the signal value of the output line 102 changes from the vertical line signal Vvl2 to a vertical line signal Vvl3. That is, the pixel signal is output from the pixel 100 to the output line 102.

A change amount from the vertical line signal Vvl2 representing a reset signal to the vertical line signal Vvl3 representing a pixel signal is denoted as ΔVv1. The change amount ΔVv1 is a value in accordance with the amount of a light entering the pixel 100.

After the output line 102 is sufficiently settled to the vertical line signal Vvl3, at the time t6, the reference signal generation circuit 106 starts supplying a ramp signal as the reference signal Vr in response to an instruction from the control circuit 112. The image sensor IM1 performs AD conversion on the vertical line signal Vvl3 corresponding to the pixel signal in a similar manner to perform AD conversion on the vertical line signal Vvl2 corresponding to the reset level signal. The memory 109S holds a digital value resulted by performing AD conversion on a vertical line signal at pixel readout. Hereafter, such AD conversion is referred to as S-conversion, and a digital value held by the S-conversion is referred to as S.

With the operation described above, the digital value N obtained by performing AD conversion on a reset level signal is held in the memory 109N, and the digital value S obtained by performing AD conversion on a pixel signal is held in the memory 109S. Then, a digital signal D in accordance with charge accumulated in the photodiode PD is generated by performing a differential operation to subtract a value held in the memory 109N from the value S held in the memory 109S in the output circuit 111.

The above is an operation to read out one pixel signal once from one pixel 100 in the imaging mode to perform normal capturing.

Next, with reference to FIG. 5, a pixel signal readout operation in the motion detection mode to detect motion of an object will be described.

Basically, a pixel signal readout operation in the motion detection mode includes the same part as in the pixel signal readout operation in the imaging mode. The difference between the imaging mode of FIG. 4 and the motion detection mode of FIG. 5 is that the operation from the time t2 to the time t4 of FIG. 4, that is, AD conversion on a reset level signal is not performed in the motion detection mode. The operations other than the above are the same as those of FIG. 4. Specifically, when described with reference to FIG. 5, the operation from the time t0 to the time t1 is the same as that of FIG. 4. After the comparator circuit 107 is set to the offset voltage Vrof at the time t1, the operation on and after the time t4 of FIG. 4 is performed.

As discussed above, in the motion detection mode, the readout operation performed by the column circuit 104 in order to process one pixel signal includes only one time of AD conversion. In contrast, in the imaging mode, the readout operation performed by the column circuit 104 in order to individually process one pixel signal includes two times of AD conversion. That is, the number of times of AD conversion in the imaging mode (the second number) is greater than the number of times of AD conversion in the motion detection mode (the first number).

Further, a one-H period in the motion detection mode is shorter than a one-H period in the imaging mode in accordance with the number of times of AD conversion. As described above, a one-H period is a period from the start to the end of a readout operation performed by the column circuit 104 in order to process one pixel signal. That is, a period from the start to the end of a readout operation performed by the column circuit 104 in order to process an added pixel signal (first period) is shorter than a period (second period) from the start to the end of a readout operation performed by the column circuit 104 in order to individually process one pixel signal.

Therefore, in a readout operation in the motion detection mode, it is possible to reduce the length of a period in which the comparator circuit 107 operates. As a result, power consumption can be reduced. During a period in which no AD conversion is performed, by controlling the control signal comp_en to the low level, it is possible to inactivate the comparator circuit 107 and reduce power consumption. Alternatively, by reducing the bias voltage "bias" to a degree by which the transistor NM1 flows no current, it is possible to inactivate the comparator circuit 107.

Note that the difference in the number of times of AD conversion and the difference in a period of a readout operation each contribute to the effect of reducing power consumption, independently. It is therefore possible to reduce power consumption as long as the image sensor IM1 has only one of the features. For example, the readout operation of the motion detection mode of FIG. 5 may include a standby operation of a period whose length corresponds to the period from the time t2 to the time t4 of FIG. 4. In such a case, the two modes have the same length of a period in which the readout operation is performed. Since the number of times of AD conversion is small, it is still possible to reduce power consumption in the motion detection mode.

The N-conversion is not performed in a readout operation in the motion detection mode of the present embodiment. Thus, noise may occur in an image. For example, the delay from the time when the comparison signal Vcmp is switched from the L level to the H level to the time when the memory 109S holds the count value is not removed. Such delay is different for respective comparator circuits 107 and thus results in vertical strips in an image. However, since the motion detection mode is intended to detect a change in an object, it is possible to tolerate some degrees of noise. Therefore, in some applications, the image sensor IM1 of the present embodiment is particularly useful.

Next, another example of the operation of the image sensor IM1 of the present embodiment will be described. First, the operation of the imaging mode is the same as that illustrated in FIG. 4. A pixel signal readout operation in the motion detection mode will be described below. FIG. 6 schematically illustrates a timing chart of a pixel signal readout operation in the motion detection mode in a similar manner to FIG. 5.

The pixel signal readout operation illustrated in FIG. 6 includes the same operation as the pixel signal readout operation illustrated in FIG. 5. In FIG. 6, each of the period from the time t0 to the time t1, the period from the time t4 to the time t5, and the period from the time t5 to the time t6 is shorter than the corresponding period in FIG. 5 (and FIG. 4).

With a shorter period from the time t0 to the time t1, the output of the comparator circuit 107 is set to the offset voltage Vrof before the vertical line signal Vvl2 representing a reset level signal is settled. Thereby, it is possible to reduce power consumption by reducing the length of a one-H period.

With a shorter period from the time t4 to the time t5, the operation to transfer charge of the photodiode PD is shortened. Further, with a shorter period from the time t5 to the time t6, AD conversion on a pixel signal is started before the vertical line signal Vvl3 representing the pixel signal is settled. The length of a one-H period can be reduced also by these features, and as a result, power consumption can be reduced.

Noise may occur in an image due to the above reduction of a period. For example, the vertical line signal Vvl2 of the output line 102 may not be sufficiently settled when the input terminal and the output terminal of the comparator circuit 107 have substantially the same voltage. This results in that the result of AD conversion contains an offset with respect to the vertical line signal Vv1. Alternatively, a transfer operation of charge may end before all the charge of the photodiode PD is transferred.

When pixel signals of a plurality of pixels 100 are added, however, the noise thereof often has no influence on the image quality. Due to addition of pixel signals, noise components are also added. Noise components in the individual pixels 100 or column circuits may vary. However, addition of these noise components allows the addition result to converge to the mean value. That is, noise components are superimposed on the whole image substantially evenly. As a result, a noisy impression can be reduced. Alternatively, when a difference of a plurality of images is acquired, noise components superimposed by substantially the same amount on each image can be cancelled.

Note that, in the present embodiment, the length of a one-H period is reduced by reducing the length of the period in which the control signal PTX is at the H level, that is, by reducing the pulse width of a pulse signal of the control signal PTX. The length of a one-H period may be reduced by reducing the pulse width of a pulse signal included in another control signal.

Further, the example of the readout operation in the motion detection mode illustrated in FIG. 6 corresponds to the operation in which a part of the pixel signal readout operation illustrated in FIG. 5 is shortened. In another example, a part of a period may be shortened in the pixel signal readout operation illustrated in FIG. 4 as a readout operation in the motion detection mode. For example, in FIG. 4, the period from the time t0 to the time t1, the period from the time t1 to the time t2, the period from the time t4 to the time t5, and the period from the time t5 to the time t6 can be shortened, respectively. Here, the period from the time t0 to the time t2 is a period from release of reset to AD conversion in a pixel reset state (N-conversion). The period from the time t4 to the time t5 is a pixel transfer period. The period from the time t5 to the time t6 is a period from the end of pixel transfer to AD conversion at pixel readout (S-conversion). In such a case, the number of times of AD conversion in the imaging mode and the number of times of AD conversion in the motion detection mode are the same. However, a one-H period in the motion detection mode is shorter than a one-H period in the imaging mode. As a result, power consumption can be reduced in the motion detection mode.

Figure 7:
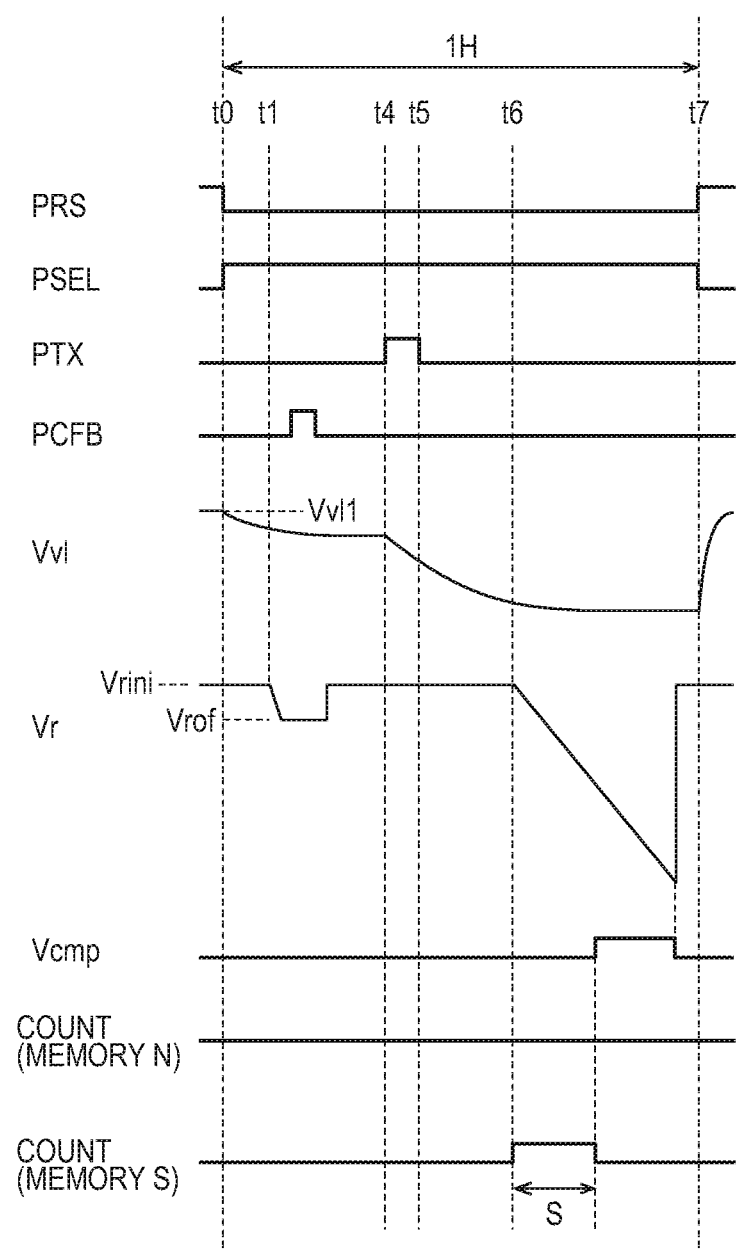
FIG. 7 is a timing chart diagram schematically illustrating driving of the photoelectric conversion device according to the first embodiment.

Next, another example of the operation of the image sensor IM1 of the present embodiment will be described. First, the operation in the imaging mode is the same as that described with FIG. 4. A pixel signal readout operation in a motion detection mode will be described below. FIG. 7 schematically illustrates a timing chart of a pixel signal readout operation in the operation detection mode in the same manner as FIG. 5 and FIG. 6.

The pixel signal readout operation illustrated in FIG. 7 includes the same operation as the pixel signal readout operation illustrated in FIG. 5. In FIG. 7, the period from the time t6 to the time t7 is shorter than the period from the time t6 to the time t7 of FIG. 5 (and FIG. 4).

The period of AD conversion in the motion detection mode is set to be shorter than the period of AD conversion in the imaging mode. Thus, in the motion detection mode, the column circuit 104 performs AD conversion on a pixel signal based on a clock signal of a first frequency. Further, in the imaging mode, the column circuit 104 performs AD conversion on a pixel signal based on a clock signal of a second frequency that is lower than the first frequency.

In the motion detection mode, since AD conversion is performed based on a high frequency clock signal, the ratio of a change of a signal value of the reference signal Vr with respect to lapse of time is large. Thus, the image quality may decrease by being affected by the linearity of the reference signal Yr. However, since a high frequency clock signal is used, the time spent by AD conversion (the time t6 to the time t7) can be reduced. As a result, power consumption can be reduced.

In the operation described above, the number of times of AD conversion or the length of a one-H period or both thereof are different between the imaging mode and the motion detection mode. As a configuration other than the above, it is possible to reduce power consumption by reducing a current supplied to the column circuit 104. Specifically, in the motion detection mode, the current value in the constant current circuit 105 or the comparator circuit 107 is reduced.

Employing different operations for the imaging mode and the motion detection mode may make control of the image sensor IM1 more complex. In contrast, changing a current value can be performed relatively easily by using a method of changing a bias voltage or the like.

Next, the configuration for adding a plurality of pixel signals and a unit configured to perform switching between the motion detection mode and the imaging mode will be described.

As illustrated in FIG. 1, the image sensor IM1 of the present embodiment includes a switch element 114. The switch element 114 connects two output lines 102 to each other. For the purpose of illustration, two output lines 102 connected to one switch element 114 are referred to as a first output line 102 and a second output line 102. In the motion detection mode, the switch element 114 is controlled at an on-state (conductive state). In the imaging mode, the switch element 114 is controlled at an off-state (non-conductive state).

When the switch element 114 is in an on-state, a pixel signal of the (first) pixel 100 connected to the first output line 102 and a pixel signal of the (second) pixel 100 connected to the second output line 102 are output at the same time. Thereby, pixel signals of the two pixels 100 are added. Specifically, the vertical line signals Vv1 of the two output lines 102 have a signal value corresponding to a mean value of a signal value of a pixel signal of the first pixel 100 and a signal value of a pixel signal of the second pixel 100.

A signal generated by addition is input to at least one of the (first) column circuit 104 connected to the first output line 102 and the (second) column circuit 104 connected to the second output line 102. It is possible to reduce power consumption in a pixel signal readout operation by operating one of the two column circuits 104 and shutting off or reducing a current to be supplied to the other.

On the other hand, in the imaging mode, when the switch element 114 is in an off-state, a pixel signal of the (first) pixel 100 connected to the first output line 102 and a pixel signal of the (second) pixel 100 connected to the second output line 102 are output at the same time. Respective pixel signals are input individually to the corresponding columns circuits 104.

In such a way, the switch element 114 is an addition unit used for adding a plurality of pixel signals and also a switch unit that performs switching between the motion detection mode and the imaging mode.

The switch element 114 adds pixel signals output from two pixels 100 belonging to pixel columns different from each other. That is, the switch element 114 performs addition in the row direction on the output line 102. In contrast, pixel signals from a plurality of pixels 100 belonging to the same pixel column may be added. To this end, the select transistors MSEL are controlled to the on-state at the same time in the plurality of pixels 100 belonging to the same pixel column. Thereby, addition in the column direction can be performed on the output line 102. In this case, the vertical scanning circuit 103 that controls the select transistors MSEL function as a switch unit that performs switching between the motion detection mode and the imaging mode.

Addition in the row direction and addition in the column direction on the output lines 102 are used in a suitable combination. Alternatively, in the embodiment of the image sensor without the switch element 114, only addition in the column direction on the output lines 102 is performed.

Addition within a pixel may be performed as another scheme to add pixel signals. With reference to a circuit block diagram of FIG. 8, the configuration of an image sensor IM2 according to a modified example will be described.

Figure 8:
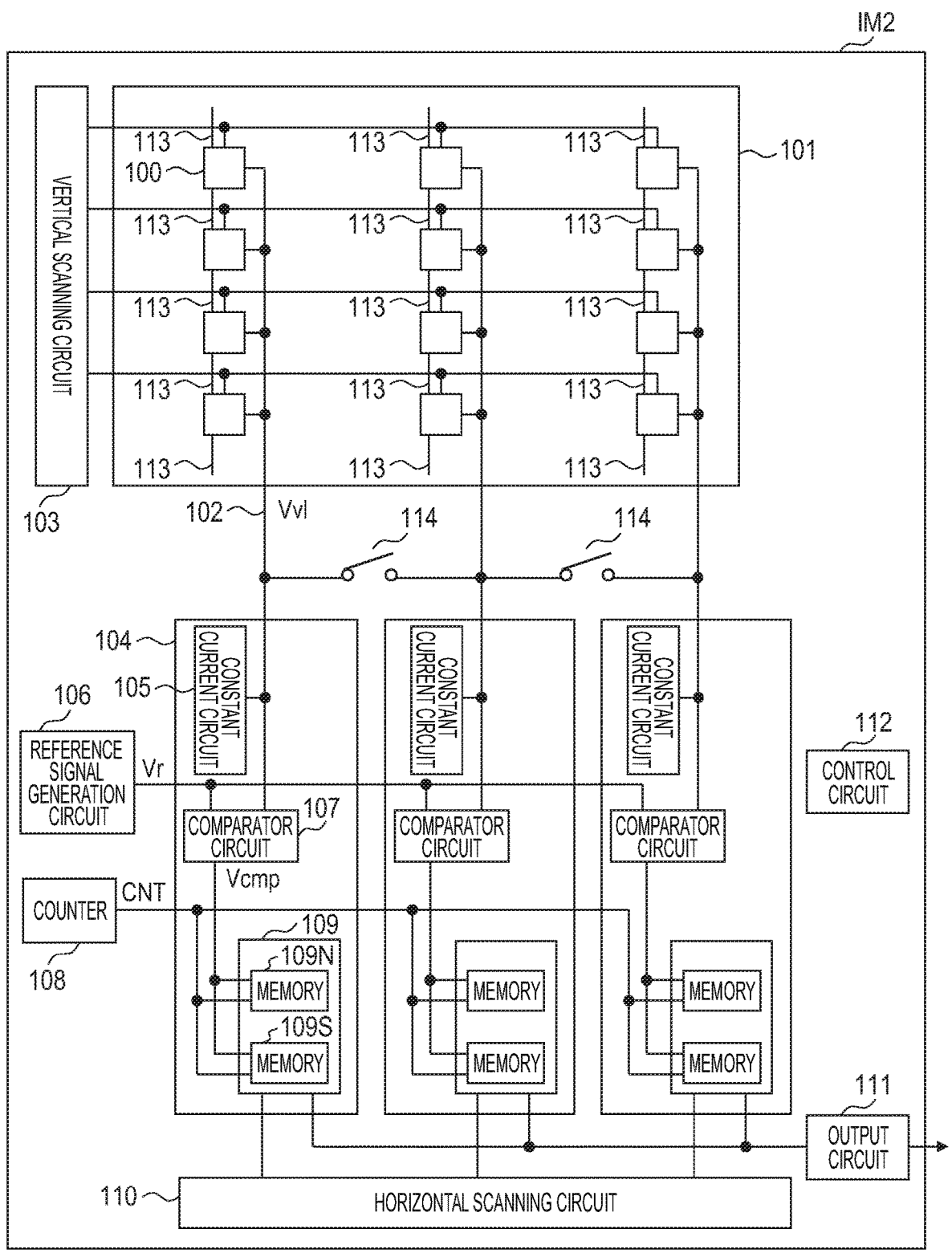
FIG. 8 is a schematic diagram of a photoelectric conversion device according to the first embodiment.

In contrast to the image sensor IM1 illustrated in FIG. 1, the image sensor IM2 further includes pixel connection elements 113 that connects the plurality of pixels 100, as illustrated in FIG. 8. Other features and operations are the same as those of the image sensor IM1.

In FIG. 8, each of the plurality of pixel connection elements 113 connects two pixels 100 aligned adjacently in the vertical direction (column direction). Furthermore, pixel connection elements 113 each connect two pixels 100 belonging to different pixel columns may be arranged. For the purpose of illustration, two pixels 100 connected by one pixel connection element 113 are referred to as the first pixel 100 and the second pixel 100.

Figure 9:
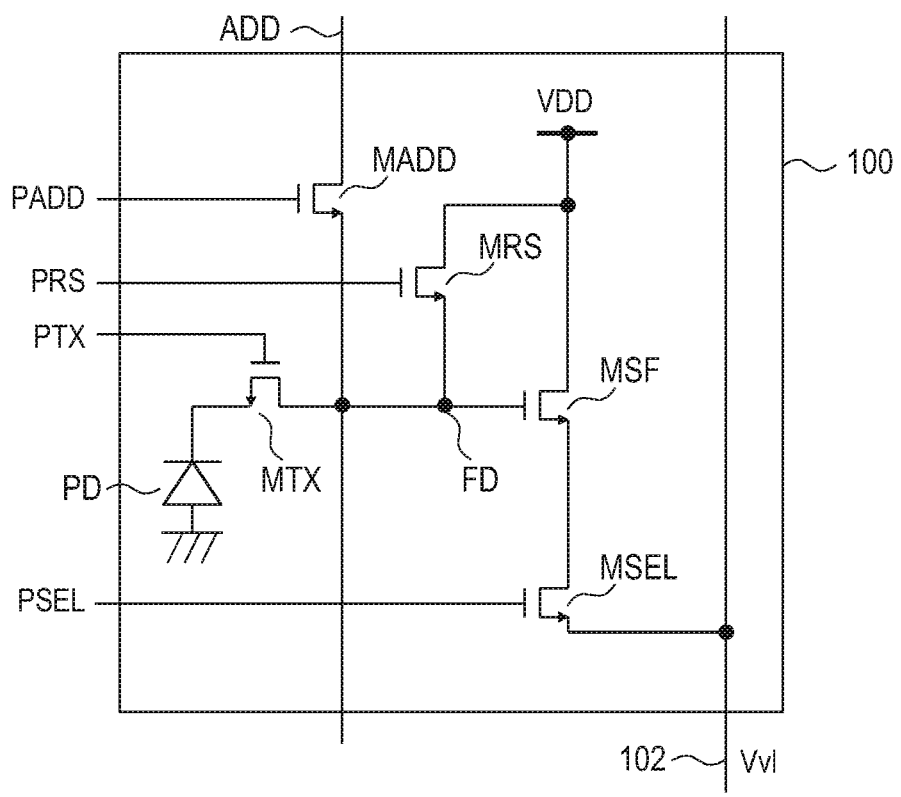
FIG. 9 is an equivalent circuit diagram of a pixel according to the first embodiment.

With reference to FIG. 9, a circuit configuration example of the pixel 100 of FIG. 8 will be described. The pixel connection element 113 of the present embodiment is formed of an addition transistor MADD. The source of the addition transistor MADD is connected to the FD node of one pixel 100. The drain of the addition transistor MADD is connected to the FD node of another pixel 100. The addition transistor MADD is controlled to a conductive state (on-state) or a non-conductive state (off-state) by a control signal PADD supplied from the vertical scanning circuit 103. In the motion detection mode, the addition transistor MADD is controlled to an on-state (conductive state). In the imaging mode, the addition transistor MADD is controlled to an off-state (non-conductive state).

When the addition transistor MADD is in the on-state, signal charge is transferred in both of the first pixel 100 and the second pixel 100 at the same time. Thereby, charge generated in the first pixel 100 and charge generated in the second pixel 100 are added in the FD node. As a result, pixel signals of two pixels 100 are added. The signal generated by addition is output to the output line 102 from at least one of the first pixel 100 and the second pixel 100. Thereby, the data amount of an image can be reduced, and power consumption can be reduced.

On the other hand, in the imaging mode, when the addition transistor MADD is in the off-state, a pixel signal readout operation of the first pixel 100 and a pixel signal readout operation of the second pixel 100 are sequentially performed. Respective pixel signals are then input to the corresponding column circuits 104 individually.

In such a way, the pixel connection element 113 is an addition unit used for adding a plurality of pixel signals and also a switch unit that switches the motion detection mode and the imaging mode. Note that, also in this modified example, the switch element 114 performs addition in the row direction. The switch element 114 performs addition of pixel signals on the output lines 102. On the other hand, the pixel connection element 113 performs addition of pixel signals within the pixel 100 (for example, the FD node).

Addition of pixel signals can also be implemented by other methods. For example, averaging in the row direction can also be implemented by using a signal input capacitor of a comparator. In such a case, some of the comparator circuits 107 can be powered down to reduce power consumption.

Further, in the present embodiment, the data amount of an image is reduced by reduction of the process in addition that pixel signals of the plurality of pixels 100 are added, and thereby power consumption can be reduced.

Finally, as an operation example of motion detection, switching between the motion detection mode and the imaging mode will be described. In an event driven type image sensor suitable to be mounted on a surveillance camera or the like, it is preferable to reduce power consumption in the motion detection mode.

To reduce power consumption, the image sensors IM1 and IM2 of the present embodiment perform power save driving in the motion detection mode and transfer to the normal imaging mode after motion detection. Specifically, a difference between a first image and a second image obtained in the motion detection mode is acquired. In response to detection of the acquired difference being greater than a threshold value, the control circuit 112 controls the switch unit so that the motion detection mode is switched to the imaging mode. At this time, since the pixel signal readout operation described above (FIG. 5 to FIG. 7) is performed in the motion detection mode, power consumption can be reduced.

Further, the image sensors IM1 and IM2 of the present embodiment can periodically perform switching to the imaging mode regardless of motion of an object during an operation of the motion detection mode. Specifically, a difference from a previous image for each of the plurality of images obtained in the motion detection mode is acquired. In response to the fact that the consecutive number of times of detecting that the difference is less than a threshold value reaches a predetermined value, the control circuit 112 controls the switch unit so that the motion detection mode is switched to the imaging mode.

With the configuration described above, it is possible to acquire an image having a high resolution periodically or in response to detection of a moving object while reducing power consumption in the motion detection mode.

Second Embodiment

Figure 10:
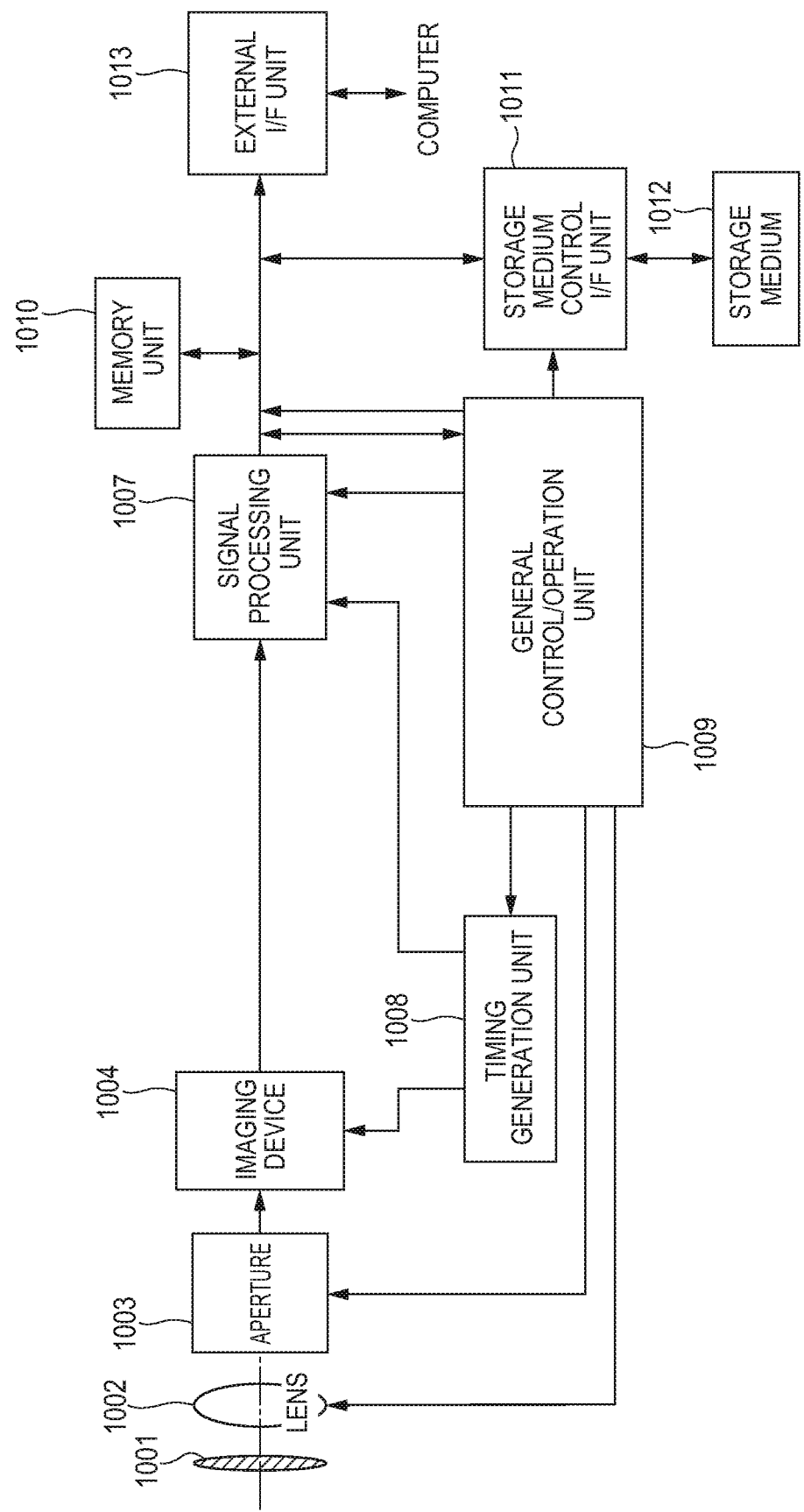
FIG. 10 is a block diagram of an embodiment of a camera.

An embodiment of a camera system will be described. The camera system may be a digital still camera, a digital camcorder, a surveillance camera, a camera head, a copy machine, a fax machine, a mobile phone, an on-vehicle camera, an observation satellite, or the like. FIG. 10 illustrates a block diagram of a surveillance camera as an example of the camera system.

In FIG. 10, a component 1001 is a barrier used for protecting a lens. A component 1002 is a lens that captures an optical image of an object onto an imaging device 1004. A component 1003 is an aperture that can change the amount of a light that has passed through the lens 1002. The photoelectric conversion device described in each embodiment described above is used for the imaging device 1004.

A component 1007 is a signal processing unit that performs processing such as correction or data compression on a pixel signal output from the imaging device 1004 and acquires an image signal. Further, in FIG. 10, a component 1008 is a timing generation unit that outputs various timing signals to the imaging device 1004 and the signal processing unit 1007, and a component 1009 is a general control unit that controls the entire camera. A component 1010 is a frame memory unit used for temporarily storing image data. A component 1011 is an interface unit used for performing storage or readout on a storage medium. A component 1012 is a removable storage medium such as a semiconductor memory used for performing storage or readout of imaging data. A component 1013 is an interface unit used for communicating with an external computer or the like.

Note that the camera system may be any system as long as it has at least the imaging device 1004 and the lens 1002 that captures a light from an object onto the imaging device 1004.

As described above, in the embodiment of the camera system, the photoelectric conversion device of each embodiment described above is used in the imaging device 1004. According to such a configuration, power consumption in a camera system can be reduced.

Third Embodiment

Figure 11A:
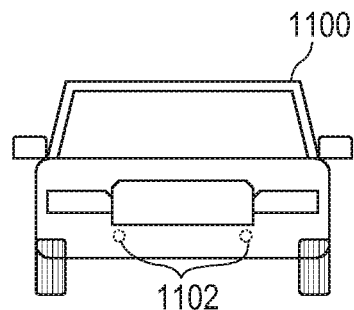
FIG. 11A, FIG. 11B, and FIG. 11C are schematic diagrams illustrating a configuration of a movable object.
Figure 11B:
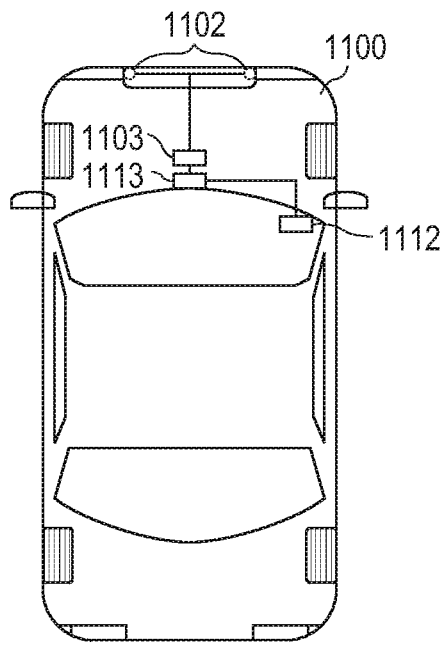
Figure 11C:
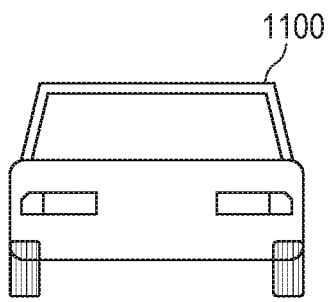

An embodiment of a movable object will be described. The movable object of the present embodiment is an automobile having an on-vehicle camera. FIG. 11A to FIG. 11C schematically illustrate the external view and the primary internal structure of an automobile 1100. FIG. 11A is a schematic front view of the automobile 1100, FIG. 11B is a schematic top view of the automobile 1100, and FIG. 11C is a schematic rear view of the automobile 1100. The automobile 1100 includes an imaging device 1102, an imaging system integrated circuit (Application Specific Integrated Circuit (ASIC)) 1103, an alert device 1112, and a main control unit 1113.

Any of the photoelectric conversion devices described in the above embodiment is used for the imaging device 1102. The alert device 1112 performs an alert to a driver when receiving a signal indicating an anomaly from an imaging system, a vehicle sensor, a control unit, or the like. The main control unit 1113 integrally controls the operation of the imaging system, the vehicle sensor, the control unit, or the like. Note that the automobile 1100 may not have the main control unit 1113. In such a case, the imaging system, the vehicle sensor, and the control unit individually have communication interfaces and transmit and receive control signals via a communication network, respectively (for example, CAN (Controller Area Network) specification).

Figure 11D:
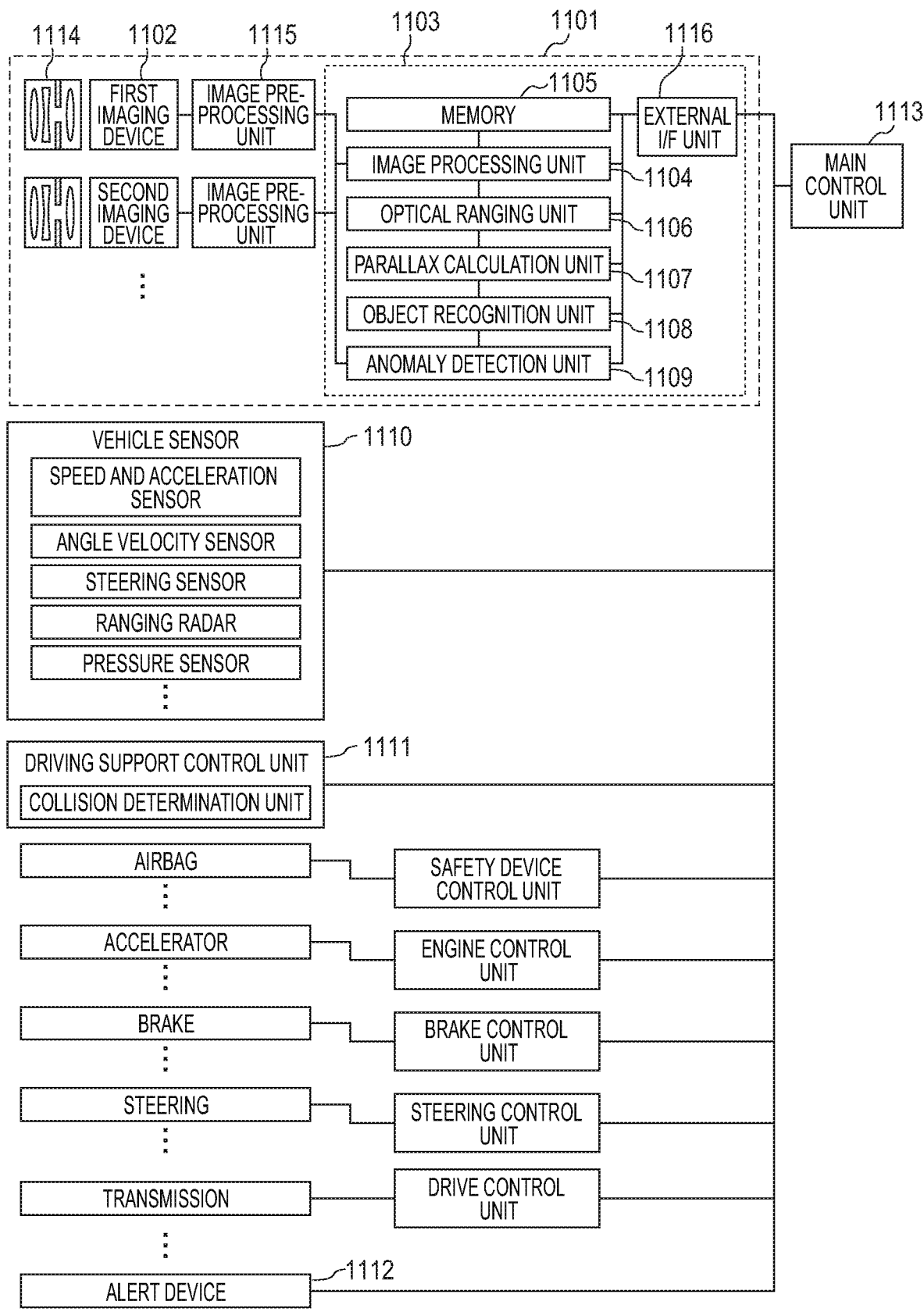
FIG. 11D is a block diagram of an embodiment of a movable object.

FIG. 11D is a block diagram illustrating a system configuration of the automobile 1100. The automobile 1100 includes a first imaging device 1102 and a second imaging device 1102. That is, the on-vehicle camera of the present embodiment is a stereo camera. An object image is captured on the imaging devices 1102 by optical units 1114. Each pixel signal output from the imaging device 1102 is processed by an image pre-processing unit 1115 and transferred to the imaging system integrated circuit 1103. The image pre-processing unit 1115 performs processing such as S-N operation, synchronization signal addition, or the like.

The imaging system integrated circuit 1103 includes an image processing unit 1104, a memory 1105, an optical ranging unit 1106, a parallax calculation unit 1107, an object recognition unit 1108, an anomaly detection unit 1109, and an external interface (I/F) unit 1116. The image processing unit 1104 processes a pixel signal to generate an image signal. Further, the image processing unit 1104 performs correction of an image signal or interpolation of an abnormal pixel. The memory 1105 temporarily holds an image signal. Further, the memory 1105 may store the position of a known abnormal pixel in the imaging devices 1102. The optical ranging unit 1106 performs focusing or ranging of an object by using image signals. The parallax calculation unit 1107 performs object collation (stereo matching) of parallax images. The object recognition unit 1108 analyzes image signals to perform recognition of an object such as an automobile, a person, a traffic sign, a road, or the like. The anomaly detection unit 1109 detects a failure or an erroneous operation of the imaging device 1102. When detecting a failure or an erroneous operation, the anomaly detection unit 1109 transmits, to the main control unit 1113, a signal indicating that an anomaly has been detected. The external I/F unit 1116 intermediates transaction of information between each unit of the imaging system integrated circuit 1103 and the main control unit 1113, various control units, or the like.

The automobile 1100 includes a vehicle information acquisition unit 1110 and a driving support control unit 1111. The vehicle information acquisition unit 1110 includes a vehicle sensor such as a speed and acceleration sensor, an angle velocity sensor, a steering angle sensor, a ranging radar, a pressure sensor, or the like.

The driving support unit 1111 includes a collision determination unit. The collision determination unit determines whether or not there is a possibility of collision with an object based on information from the optical ranging unit 1106, the parallax calculation unit 1107, or the object recognition unit 1108. The optical ranging unit 1106 or the parallax calculation unit 1107 is an example of a distance information acquisition unit that acquires distance information on the distance to an object. That is, the distance information is information regarding a parallax, a defocus amount, a distance to an object, or the like. The collision determination unit may use any of the distance information to determine the collision possibility. The distance information acquisition unit may be implemented by dedicatedly designed hardware or may be implemented by a software module.

Although the example in which the driving support unit 1111 controls the automobile 1100 so as not to collide with another object has been described, the driving support unit 1111 is applicable to automatic driving control to follow another vehicle, automatic driving control not to go out of a traffic lane, or the like.

The automobile 1100 further includes drive units used for traveling, such as an airbag, an accelerator, a brake, a steering, a transmission, or the like. Further, the automobile 1100 includes control units thereof. Each of the control units controls the corresponding drive unit based on a control signal from the main control unit 1113.

As described above, in the embodiment of the automobile, any of the photoelectric conversion devices of the embodiment described above is used in the imaging device 1102. According to such a configuration, power consumption can be reduced.

According to the disclosure, power consumption can be reduced.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-198703, filed Oct. 22, 2018 which is hereby incorporated by reference herein in its entirety.

What is claimed is:

1. A photoelectric conversion device comprising:
a plurality of pixels arranged in a plurality of rows;
a signal processing circuit that performs analog-to-digital conversion on signals output from the plurality of pixels;
a scan circuit that supplies a select signal for selecting a pixel from which the signals are read; and
a switch unit that performs switching between a first mode for motion detection to input a first signal generated by adding signals of at least two pixels to the signal processing circuit and a second mode to input respective signals of the at least two pixels to the signal processing circuit individually as second signals,
wherein in the first mode, a first period from a start of output to an end of output from the pixel is shorter than a second period from a start of output of an end of output from the pixel in the second mode.

2. The photoelectric conversion device according to claim 1,
wherein in the first mode, a control signal for controlling the plurality of pixels or the signal processing circuit includes a pulse signal of a first pulse width, and
wherein in the second mode, the control signal includes a pulse signal of a second pulse width that is longer than the first pulse width.

3. The photoelectric conversion device according to claim 1,
wherein in the first mode, the signal processing circuit performs analog-to-digital conversion based on a clock signal of a first frequency, and
wherein in the second mode, the signal processing circuit performs analog-to-digital conversion based on a clock signal of a second frequency that is lower than the first frequency.

4. The photoelectric conversion device according to claim 1,
wherein in the first mode, the readout operation performed by the signal processing circuit in order to process the first signal includes a first number of times of the analog-to-digital conversion, and
wherein in the second mode, the readout operation performed by the signal processing circuit in order to process one of the second signals includes a second number of times, which is greater than the first number of times, of the analog-to-digital conversion.

5. The photoelectric conversion device according to claim 4,
wherein each of the plurality of pixels includes an input node that receives a signal based on charge generated by photoelectric conversion and a reset unit that resets the input node,
wherein in the first mode, any of the at least two pixels outputs the first signal in a state where a signal based on charge generated by the photoelectric conversion is input to the input node,
wherein in the second mode, each of the at least two pixels outputs a reset level signal in a state where the input node is reset and further outputs the second signals in a state where the signal based on charge generated by photoelectric conversion is input to the input node, and
wherein in the second mode, the readout operation performed by the signal processing circuit in order to process one of the second signals includes analog-todigital conversion on the reset level signal and analog-to-digital conversion on the second signals.

6. The photoelectric conversion device according to claim 1,
wherein the plurality of pixels are arranged to form a plurality of columns,
wherein the signal processing circuit includes a plurality of column circuits each including an analog-to-digital converter,
wherein in the first mode, the first signal is input to at least one of the plurality of column circuits, and
wherein in the second mode, the second signals from the at least two pixels are input individually to two column circuits of the plurality of column circuits.

7. The photoelectric conversion device according to claim 6 further comprising a plurality of output lines corresponding to the plurality of columns,
wherein the switch unit includes a first switch element that connects two of the plurality of output lines to each other,
wherein the first signal is generated by the first switch element being in an on-state, and
wherein when the first switch element is in an off-state, the second signals from the at least two pixels are input individually to the two column circuits.

8. The photoelectric conversion device according to claim 1,
wherein each of the plurality of pixels includes an input node that receives a signal based on charge generated by photoelectric conversion,
wherein the switch unit includes a second switch element that connects the input nodes of the at least two pixels to each other,
wherein the first signal is generated by the second switch element being in an on-state, and
wherein when the second switch element is in an off-state, the second signals from the at least two pixels are input individually to the signal processing circuits.

9. The photoelectric conversion device according to claim 1,
wherein the plurality of pixels include input nodes that receive signals based on charge generated by photoelectric conversion, respectively,
wherein the plurality of pixels are arranged to form a plurality of columns,
wherein the signal processing circuit includes a plurality of column circuits each including an analog-to-digital converter,
wherein the switch unit includes a first switch element that connects two of the plurality of output lines to each other and a second switch element that connects the input nodes of the at least two pixels to each other,
wherein in the first mode, the first signal is generated and input to at least one of the plurality of column circuits by both the first switch element and the second switch element being in an on-state, and
wherein in the second mode, when the first switch element is in an off-state, the second signals from the at least two pixels are input individually to the signal processing circuit.

10. The photoelectric conversion device according to claim 1 further comprising a control unit that acquires a difference between a first image and a second image obtained in the first mode and, in response to detection of the difference being greater than a threshold value, switches the first mode to the second mode.

11. The photoelectric conversion device according to claim 1 further comprising a control unit that acquires a difference from a previous image for each of a plurality of images obtained in the first mode and, in response to a fact that the consecutive number of times of detecting that the difference is less than a threshold value reaches a predetermined value, switches the first mode to the second mode.

12. The photoelectric conversion device according to claim 1,
wherein each of the plurality of pixels includes an input node that receives a signal based on charge generated by photoelectric conversion and a reset unit that resets the input node, and
wherein a period from release of reset of the pixels to analog-to-digital conversion on a reset level signal in the first mode is shorter than a period from release of reset of the pixels to analog-to-digital conversion on a reset level signal in the second mode.

13. The photoelectric conversion device according to claim 1,
wherein each of the plurality of pixels includes an input node that receives a signal based on charge generated by photoelectric conversion and a transfer transistor that transfers the charge to the input node, and
wherein a period in which the transfer transistor is in an on-state in the first mode is shorter than a period in which the transfer transistor is in an on-state in the second mode.

14. The photoelectric conversion device according to claim 1,
wherein each of the plurality of pixels includes an input node that receives a signal based on charge generated by photoelectric conversion and a transfer transistor that transfers the charge to the input node, and
wherein a period from a time when the transfer transistor that is turned on for transfer of the charge is turned off to a time when analog-to-digital conversion on the first signal is started in the first mode is shorter than a period from a time when the transfer transistor that is turned on for transfer of the charge is turned off to a time when analog-to-digital conversion on the second signal is started in the second mode.

15. The photoelectric conversion device according to claim 1, wherein in the first mode, a first period from a start of output to an end of output from pixels in a row containing the pixel is shorter than a second period from a start of output to an end of output from pixels in a row containing the pixel in the second mode.

16. The photoelectric conversion device according to claim 1 further comprising a select transistor,
wherein in the first mode, a first period between a transition of the select transistor from off to on and a next transition of the select transistor from on to off is shorter than a second period between a transition of the select transistor from off to on and a next transition of the select transistor from on to off.

17. A photoelectric conversion device comprising:
a plurality of pixels;
a signal processing circuit that performs analog-to-digital conversion on signals output from the plurality of pixels;
a scan circuit that supplies a select signal for selecting a pixel from which the signals are read; and
a switch unit that performs switching between a first mode for motion detection to input a first signal generated by adding signals of at least two pixels to the signal processing circuit and a second mode to input respective signals of the at least two pixels to the signal processing circuit individually as second signals, wherein in the first mode, a first analog-to-digital conversion period corresponding to a period from a start of output to an end of output from the pixel is shorter than a second analog-to-digital conversion period corresponding to a period from a start of output to an end of output from the pixel in the second mode into a digital signal.

18. The photoelectric conversion device according to claim 17,
wherein each of the plurality of pixels includes an input node that receives a signal based on charge generated by photoelectric conversion and a reset unit that resets the input node,
wherein in the first mode, any of the at least two pixels outputs the first signal in a state where a signal based on charge generated by the photoelectric conversion is input to the input node,
wherein in the second mode, each of the at least two pixels outputs a reset level signal in a state where the input node is reset and further outputs the second signals in a state where the signal based on charge generated by photoelectric conversion is input to the input node, and
wherein in the second mode, the readout operation performed by the signal processing circuit in order to process one of the second signals includes analog-to-digital conversion on the reset level signal and analog-to-digital conversion on the second signals.

19. The photoelectric conversion device according to claim 17,
wherein in the first mode, a control signal for controlling the plurality of pixels or the signal processing circuit includes a pulse signal of a first pulse width, and
wherein in the second mode, the control signal includes a pulse signal of a second pulse width that is longer than the first pulse width.

20. The photoelectric conversion device according to claim 17,
wherein in the first mode, the signal processing circuit performs analog-to-digital conversion based on a clock signal of a first frequency, and
wherein in the second mode, the signal processing circuit performs analog-to-digital conversion based on a clock signal of a second frequency that is lower than the first frequency.

21. The photoelectric conversion device according to claim 17,
wherein the plurality of pixels are arranged to form a plurality of columns,
wherein the signal processing circuit includes a plurality of column circuits each including an analog-to-digital converter,
wherein in the first mode, the first signal is input to at least one of the plurality of column circuits, and
wherein in the second mode, the second signals from the at least two pixels are input individually to two column circuits of the plurality of column circuits.

22. The photoelectric conversion device according to claim 21 further comprising a plurality of output lines corresponding to the plurality of columns,
wherein the switch unit includes a first switch element that connects two of the plurality of output lines to each other,
wherein the first signal is generated by the first switch element being in an on-state, and
wherein when the first switch element is in an off-state, the second signals from the at least two pixels are input individually to the two column circuits.

23. The photoelectric conversion device according to claim 22, wherein each of the first number of times and the second number of times is the number of times of analog-to-digital conversion performed by one of the column circuits.

24. The photoelectric conversion device according to claim 17,
wherein each of the plurality of pixels includes an input nodes that receives signal based on charge generated by photoelectric conversion,
wherein the switch unit includes a second switch element that connects the input nodes of the at least two pixels to each other,
wherein the first signal is generated by the second switch element being in an on-state, and
wherein when the second switch element is in an off-state, the second signals from the at least two pixels are input individually to the signal processing circuits.

25. The photoelectric conversion device according to claim 17,
wherein the plurality of pixels include input nodes that receive signals based on charge generated by photoelectric conversion, respectively,
wherein the plurality of pixels are arranged to form a plurality of columns,
wherein the signal processing circuit includes a plurality of column circuits each including an analog-to-digital converter,
wherein the switch unit includes a first switch element that connects two of the plurality of output lines to each other and a second switch element that connects the input nodes of the at least two pixels to each other,
wherein in the first mode, the first signal is generated and input to at least one of the plurality of column circuits by both the first switch element and the second switch element being in an on-state, and
wherein in the second mode, when the first switch element is in an off-state, the second signals from the at least two pixels are input individually to the signal processing circuit.

26. The photoelectric conversion device according to claim 17 further comprising a control unit that acquires a difference between a first image and a second image obtained in the first mode and, in response to detection of the difference being greater than a threshold value, switches the first mode to the second mode.

27. The photoelectric conversion device according to claim 17 further comprising a control unit that acquires a difference from a previous image for each of a plurality of images obtained in the first mode and, in response to a fact that the consecutive number of times of detecting that the difference is less than a threshold value reaches a predetermined value, switches the first mode to the second mode.

28. A camera comprising:
the photoelectric conversion device according to claim 1; and
an optical unit that captures a light from an object onto the photoelectric conversion device.

29. A movable object comprising:
the camera according to claim 28; and
a control unit that controls the movable object based on an image signal acquired by the camera.

* * * * *